(12) United States Patent
Haytayan

(10) Patent No.: US 7,025,551 B2
(45) Date of Patent: Apr. 11, 2006

(54) FASTENER CLIP FOR USE IN SUPPLYING FASTENERS TO A FASTENER DRIVING TOOL

(76) Inventor: Harry M. Haytayan, 32 Indian Rock Rd., Nashua, NH (US) 03063

( * ) Notice: Subject to any disclaimer, the term of this patent is extended or adjusted under 35 U.S.C. 154(b) by 225 days.

(21) Appl. No.: 10/618,327

(22) Filed: Jul. 11, 2003

(65) Prior Publication Data

US 2004/0109743 A1 Jun. 10, 2004

Related U.S. Application Data

(63) Continuation-in-part of application No. 10/195,216, filed on Jul. 15, 2002, now Pat. No. 6,676,353.

(51) Int. Cl.
*F16B 25/10* (2006.01)
*B65D 85/24* (2006.01)

(52) U.S. Cl. .................. 411/442; 411/387.1; 411/387.5; 411/399; 206/346

(58) Field of Classification Search ..... 411/486–487.8, 411/399, 442, 411; 206/345–347
See application file for complete search history.

(56) References Cited

U.S. PATENT DOCUMENTS

| | | | |
|---|---|---|---|
| 3,828,925 A * | 8/1974 | Magyar et al. | 206/346 |
| 4,040,554 A | 8/1977 | Haytayan | |
| 4,480,951 A * | 11/1984 | Regensburger | 408/224 |
| 4,655,661 A | 4/1987 | Brandt | |
| 5,046,396 A | 9/1991 | Pfister | |
| 5,046,905 A * | 9/1991 | Piacenti et al. | 411/387.2 |
| 5,516,248 A | 5/1996 | DeHaitre | |
| 5,645,208 A | 7/1997 | Haytayan | |
| 5,772,376 A * | 6/1998 | Konig | 411/399 |
| 5,775,514 A * | 7/1998 | Lin | 206/347 |
| 5,788,445 A | 8/1998 | Huang | |
| 5,931,298 A | 8/1999 | Huang | |
| 5,984,096 A | 11/1999 | Shinjo | |
| 6,036,013 A | 3/2000 | Chen | |
| 6,106,208 A | 8/2000 | Lin | |
| 6,109,144 A | 8/2000 | Muro | |
| 6,139,236 A | 10/2000 | Ito | |
| 6,676,353 B1 * | 1/2004 | Haytayan | 411/442 |
| 6,698,987 B1 * | 3/2004 | Dicke | 411/387.6 |
| 6,832,696 B1 * | 12/2004 | Donner | 221/197 |

OTHER PUBLICATIONS

Muro North America, Autofeed Screwdriver Systems, website printout of screws.
Muro North America, Autofeed Screwdriver Systems, website printout of FLVL41 Power Driver.

* cited by examiner

*Primary Examiner*—Flemming Saether
(74) *Attorney, Agent, or Firm*—Pandiscio & Pandiscio

(57) ABSTRACT

A clip of fasteners for use in attaching a structural panel to a metal substrate comprises a plastic strip with openings characterized by inwardly-extending ribs for gripping and supporting fasteners that comprise a forward self-drilling portion, a rearward self-tapping thread portion and cutting blade means formed integral with the self-drilling portion. Each fastener has a head with a top surface adapted for driving engagement by a driver tool for rotatively driving the fastener, and a tapered surface having a plurality of circumferentially spaced cutting edges that function to cut away the ribs supporting the fastener as the fastener is rotatively driven through the structural panel to secure the panel to the substrate and create a countersink in the structural panel.

19 Claims, 3 Drawing Sheets

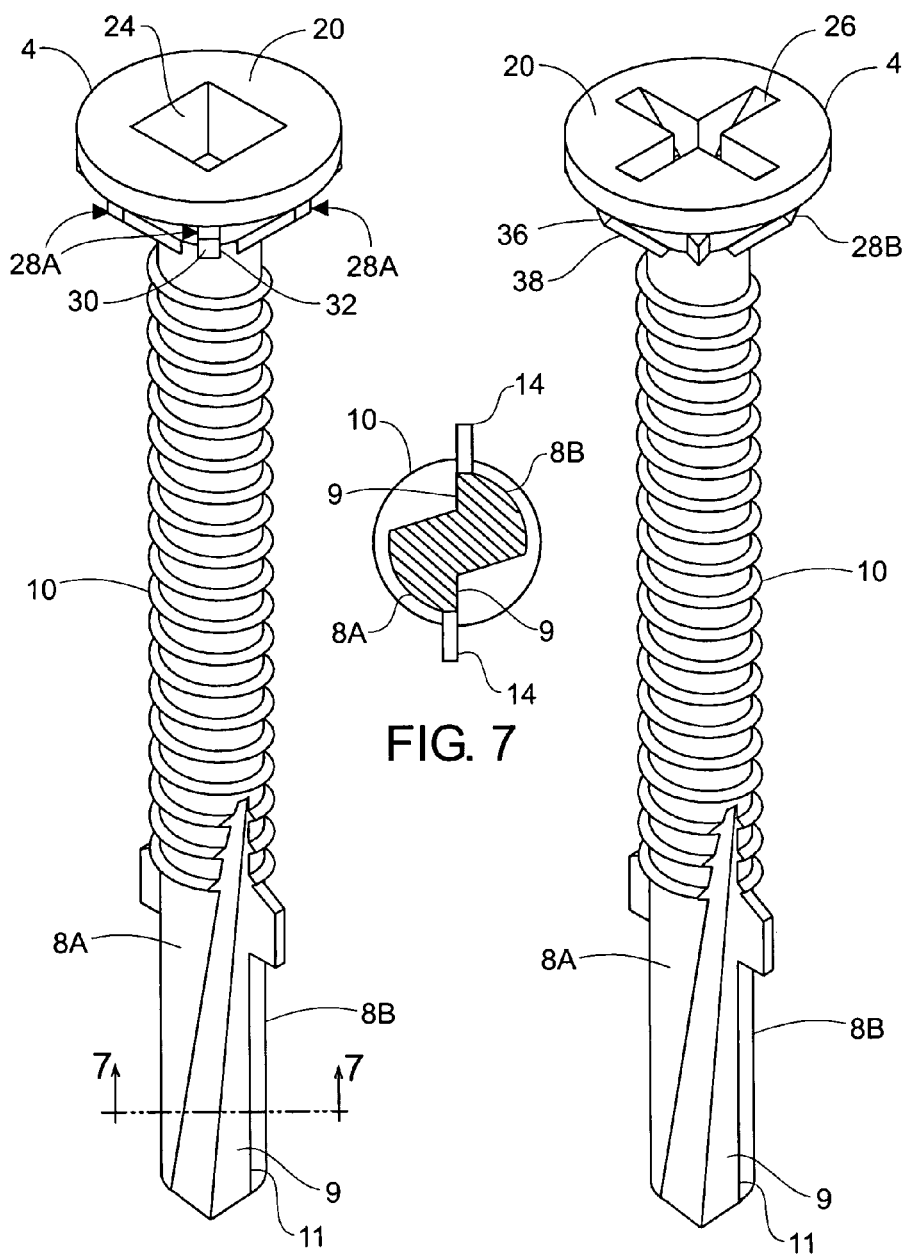

FASTENER CLIP FOR USE IN SUPPLYING FASTENERS TO A FASTENER DRIVING TOOL

This application is a continuation in part of my U.S. patent application Ser. No. 10/195,216, filed Jul. 15, 2002 now U.S. Pat. No. 6,676,353, for "Self-Drilling, Self-Tapping Screws".

FIELD OF THE INVENTION

The present invention generally relates to the use of fasteners for securing together superimposed structural components, and more particularly to a clip of fasteners for use with a fastener driver,

BACKGROUND OF THE INVENTION

It is well known to use screws and nails, or similar pin-type fasteners, for securing floor, wall and ceiling panels to supporting structures in buildings and vehicle cargo container bodies. In the case of truck trailer bodies, hard wood floors are attached to a metal frame or substrate. The typical truck trailer body has a steel frame, and the hardwood flooring is secured to the steel frame with metal fasteners. The existing technology for securing floors to truck trailer bodies requires pre-drilling holes in both the wood flooring and the underlying metal substrate, e.g., metal frame components such as steel angle irons or junior I-beams, and using a powered screwdriver to drive to apply self-tapping screws through the pre-drilled holes to anchor the flooring to the metal substrate. In some cases, vehicle cargo bodies or personnel-containing structures, e.g., mobile homes, may use aluminum framing. Since aluminum frame members are more easily penetrated than steel frame members of the same thickness, wood flooring and wall and ceiling panels may be attached to aluminum framing by means of nail-type pins with spiral grooves disposed along a portion of their length, with those pins being driven through the flooring and into aluminum frame members by means of a pneumatic high impact nail driver, e.g., a driver as disclosed in my U.S. Pat. Nos. 5,645,208, issued 8 Jul. 1997 and 4,040,554, issued 9 Aug. 1977.

However, using a pneumatic high impact nail driver has certain limitations with respect to applications involving hard wood flooring and steel framing. For one thing, the high impact produced by such a driver tends to split the hardwood flooring. Also, some steel framing members are too thin, which results in bending of the steel substrate by the fasteners under the force exerted by the high impact driver. Moreover, since it is strictly a hammer-like impact procedure, when a fastener is driven through the floor into an underlying high tensile strength frame member, the fastener may or may not be driven properly to force the flooring member into a tight fit with the frame, resulting in it not passing inspection requirements. Consequently the procedure using predrilled holes and self-tapping screws has become standard industry practice.

In an attempt to avoid the necessity of pre-drilling the underlying frame members, driver/fastening systems have been conceived that utilize special high carbon steel self-drilling, self-tapping screws and a high torque rotary screwdriver. However, for the most part, those systems function satisfactorily only if the underlying metal to be penetrated is a mild steel, e.g., A-36 steel, and has a maximum thickness of about ⅛" or less. A further impedance to use of self-drilling screws is that currently some trailer body manufacturers prefer to use a high tensile strength steel having a tensile strength of 80,000 psi and a yield strength of approximately 50,000–65,000 psi. It is difficult to reliably penetrate that high tensile strength steel in a thickness of ⅛", since in the process of attempting to do so the screws tend to burn due to the heat buildup. Therefore, there has existed a need for an improved fastening method and apparatus which can reliably attach wood flooring to high tensile strength steel substrates having a thickness in the order of ⅛" or thicker. Such a method and apparatus is described and illustrated in my copending U.S. patent application Ser. No. 10/619,374, filed on even date herewith, for "Method And Apparatus For Attaching Structural Components With Fasteners", which application is a continuation-in-part of my prior U.S. application Ser. No. 10/195,207, filed Jul. 15, 2002. To extent necessary, the disclosure of that copending application identified by (hereinafter referred to as the "HMH-90 CIP application") is incorporated herein by reference The apparatus disclosed in my HMH-90 CIP application involves use of a pneumatic rotary impact torque driver, such as the Model 2131 pneumatic driver made by Ingersoll-Rand Co. of 200 Chestnut Ridge Road, Woodcliff Lake, N.J. 07675, and self-drilling, self-tapping fasteners, and includes a magazine that is adapted to accommodate a plurality of self-drilling, self-tapping screw fasteners mounted in a supporting plastic strip, with the fasteners being formed so as to facilitate their removal from the plastic strip when being driven into fastening relation with structural components.

OBJECTS AND SUMMARY OF THE INVENTION

The object of this invention is to provide an improved and novel clip of fasteners for use with fastener driver apparatus as described in my HMH-90 CIP application.

Another object of the invention is to provide a clip of fasteners for use with a powered impact torque driver apparatus having a magazine for accommodating the clip, the clip comprising an improved plastic fastener-retaining strip adapted to be supported by and moved along a magazine into fastener-driving position relative to the driver associated with the magazine, and a plurality of self-drilling, self-tapping screw fasteners supported by the plastic strip, with the plastic strip being adapted to assure proper alignment of each fastener as it is advanced into fastener driving position relative to the driver and the fasteners being formed so as to facilitate their removal from the plastic strip when being driven into fastening relation with structural components.

These and other objects of the invention are achieved by providing a plurality of fasteners inserted in and carried by a plastic strip. The fasteners are formed with a pointed tip, a first self-drilling portion contiguous with the pointed tip, a pair of cutting wings projecting from the self-drilling portion, a second self-tapping screw portion contiguous with the first drilling portion, and a head that is adapted to be rotatively driven by a torque driver. The plastic strip is adapted to be inserted into a magazine associated with a rotary impact driver and comprises a series of uniformly spaced through holes for accommodating the fasteners, with each hole being characterized by a fastener-retaining elements in the form of a plurality of mutually spaced radially-extending ribs and webs interconnecting the ribs at the top side of the plastic strip for gripping the inserted fastener. The webs between the ribs at the top side of the plastic strip assist the ribs in holding the fasteners vertical at a right angle to the longitudinal axis of the plastic strip, thereby assuring proper alignment of the fasteners when advanced into position to be driven by the driver.

Each fastener is formed with cutting elements on its head that operate to cut through the fastener-retaining elements that grip it as it is driven into a work piece consisting of at least a structural component made of wood or metal and a metal substrate. Each fastener is driven into the workpiece by engaging the head of the fastener with a tool bit attached to the rotary impact driver, and operating the driver so as to rotatively drive the first self-drilling portion of the fastener into the structural component and cause that drilling portion to drill a hole through said component, and then rotatively impact drive the fastener so as to cause said fastener to penetrate and drill a hole through said substrate and make a screw connection with the substrate. Other features and advantages of the invention are described or rendered obvious by the following detailed specification.

THE DRAWINGS

FIGS. 5 and 6 are perspective views of two fasteners with different head designs; and FIG. 7 is a sectional view taken along line 7—7 of FIG. 5. In the drawings like parts are identified by like numerals.

DETAILED DESCRIPTION

Figure 1:
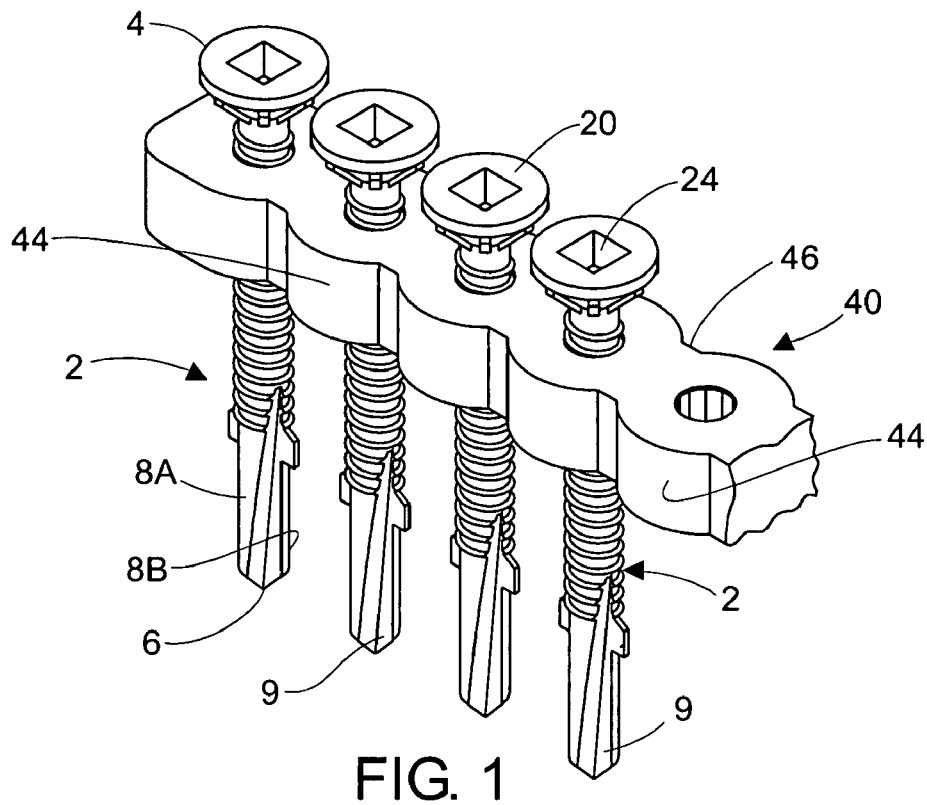
FIG. 1 is a perspective view showing a portion of a clip consisting of an improved plastic strip and a plurality of fasteners supported by a plastic strip.

Referring to FIGS. 1—7, the illustrated fasteners 2 each includes a head 4, a tapered tip 6 and a shaft that comprises a forward self-drilling section that is contoured to form two like cutting opposed flutes 8A and 8B and a rearward self-tapping section that is characterized by a screw thread 10 that commences at the cutting flutes 8. Each flute 8A and 8B is characterized by a flat cutting face 9 that forms a cutting edge 11. The two cutting faces 9 extend parallel to one another on opposite sides of and parallel to an imaginary diametrically extending plane, i.e., a plane that that includes the center axis of the fastener.

The screw thread 10 preferably extends to where the head 4 joins the shaft. However, it is contemplated that the screw thread may terminate short of the fastener head. Preferably screw thread 10 has a triangular shape in cross-section, so that the thread has a sharp cutting edge. The maximum diameter of the self-tapping screw section exceeds by a small amount, e.g., 0.008 inch, the maximum diameter of the forward self-drilling section comprising flutes 8, whereby to allow the self-tapping section of the fastener to cut a mating screw thread in the hole formed in a metal substrate by the drilling flutes of the fastener's forward self-drilling section. Preferably the thread has a pitch angle in the range of about 57° to about 63° and a flat root, and the tip 216 has an apex angle Ø in the range of about 110° to about 120° so as to facilitate piercing steel or other metal as hereinafter described.

Each fastener also is formed with two diametrically opposed laterally-extending blade-like cutting wings 14 at the trailing end of the two cutting flutes. The wings are relatively thin, e.g., 0.04 inch, and the bottom edge 16 of each wing, i.e., the end edge closest to the tip 6, serves as a cutting edge to cut into a wood flooring member and enlarge the hole formed therein by flutes 8A and 8B. Wings 14 are sized so as to enlarge that hole to a diameter that is slightly larger, e.g., by about 0.015 inch, than the o.d. of the threaded section 10 of the fastener.

Figure 4:
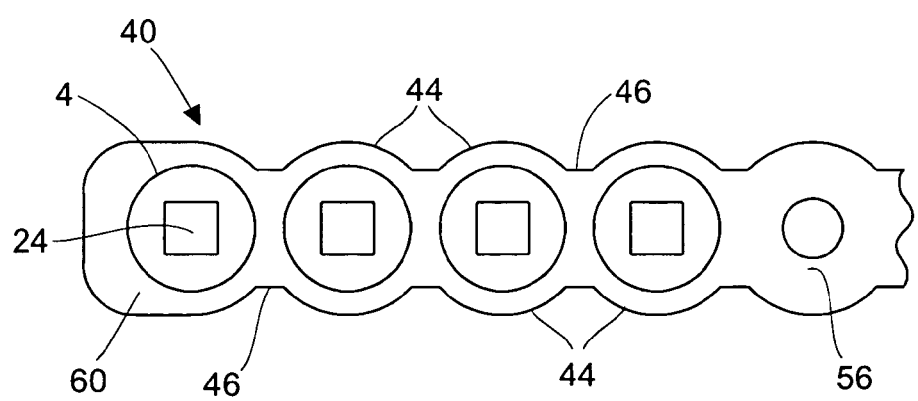
FIG. 4 is a plan view of the same clip.

The head 4 is formed with a flat top surface 20 and a tapered side surface 22. Top surface 20 is formed with a suitable recess for interlocking with a driver tool bit. As illustrated in FIGS. 4 and 5, the upper surface 20 may be provided with a square recess 24 for receiving the square end of a driver's tool bit. Of course, the recess in top surface 20 may have a different shape to accommodate a tool bit with a different end configuration. Thus, as shown in FIG. 6, for example, the fastener head may have a cross-shaped recess 26. Another example is a multi-lobe recess as illustrated in my copending HMH-90 CIP application, with the lobes being beveled so as to slope inwardly and downwardly from the surrounding portions of top surface 20 to facilitate insertion of a Torx®-style tool bit of like multi-lobe shape.

Additionally, the tapered side surface 22 is formed with a plurality of cutting ribs 28A (FIGS. 1–3 and 5) or 28B (FIG. 6) that are spaced uniformly from one another about the circumference of tapered surface 22. A total of six ribs are preferred but not essential. Ribs 28A have a square or rectangular cross-sectional shape, with the outwardly extending opposite sides 30 and 32 of each rib extending on opposite sides of and parallel to an imaginary diametrically-extending plane, i.e., a plane that includes the center axis of the fastener and is equally spaced from side surfaces 30 and 32. The forward edges of flat sides 30 and 32, i.e., more specifically, the corners formed by those sides with the outer side of the rib, function as cutting blade edges depending on the direction of rotation of the fastener. Alternatively the ribs may have a triangular cross-sectional shape as illustrated by ribs 28B in FIG. 6, with the corner formed by the intersection of the two side surfaces 36 and 38 serving as a cutting blade edge.

Referring to FIGS. 1–4, the fasteners 2 are preferably mounted in a plastic mounting strip 40 having a series of uniformly spaced circular through holes 42 for accommodating the fasteners. The holes extend perpendicular to the flat top and bottom surfaces of strip 40. Preferably, but not necessarily, the strip is molded of polyethylene, polypropylene or nylon and is of moderate density and flexibility. The plastic strip may have flat longitudinally-extending opposite side surfaces, but in the preferred embodiment of the invention the opposite side surfaces are contoured with circularly curved segments 44, creating the general impression of a plurality of sleeves connected in series with one another. Contouring the side surfaces as shown and described serves to reduce the amount of surface area of the strip that is contacted by the magazine in which it is supported in fastener-advancing relation to the associated fastener driver and also to reduce the amount of plastic consumed in making the strip. It is intended that the strip remain intact (except for the removal of certain fastener-gripping features) when a fastener is driven in the manner contemplated by this invention. Accordingly the reduced width portions 46 of the strip resulting from the contouring of the side surfaces may be relatively thick as shown so as to provide stability and assure that the strip will not rupture when the fasteners are impacted by the driver apparatus.

Figure 3:
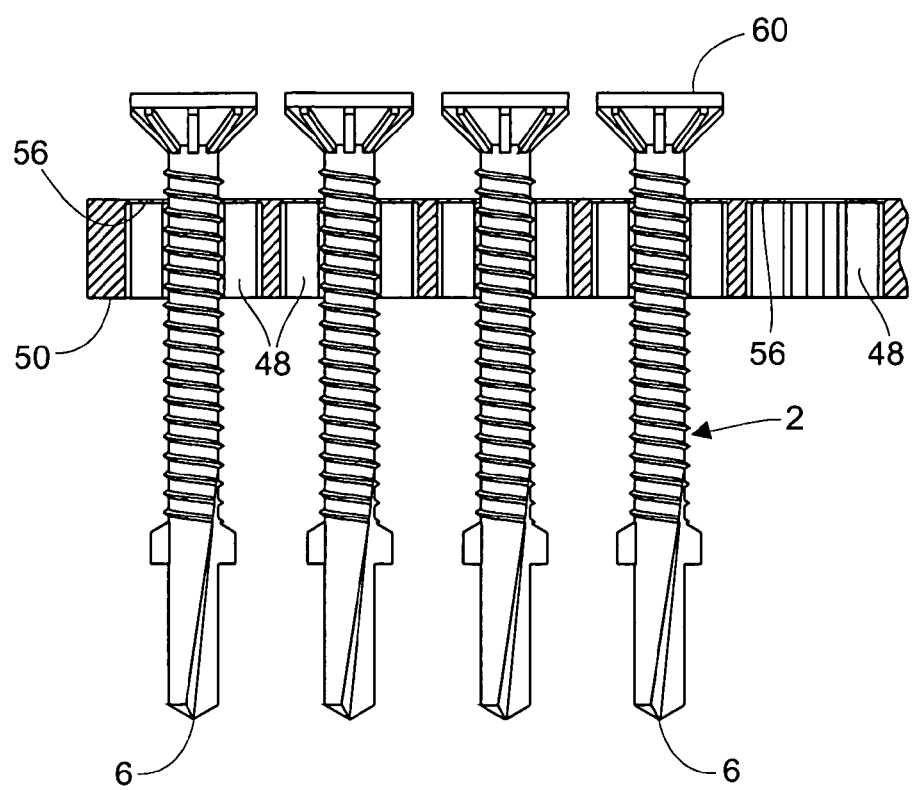
FIG. 3 is a longitudinal center line sectional view in elevation of the same clip.

The holes 42 in strip 40 have a constant diameter, except for the presence of a plurality of radially-extending, uniformly spaced fastener-retaining ribs 48. Preferably, as shown in FIG. 3, the bottom ends of ribs 48 are flush with the bottom edge surfaces 50 of the strip, but the bottom edge surfaces of the ribs may be recessed slightly, e.g., about 1/16 inch, above the level of the bottom surfaces 50 without affecting operation of the invention. At their upper ends the ribs are connected by thin webs 56 that collectively coact with ribs 48 to form a top annular end wall for the hole 42. The upper sides of webs 56 and the upper ends of ribs 58 are flush with the top surface 60 of strip 40. Ribs 48 and webs 56 have substantially identical radial dimensions, with their inner ends being curved and tangent to a circle having a diameter which is slightly smaller than the maximum diameter of the threaded portion of the fasteners, whereby to tightly grip the fasteners.

In its preferred embodiment, each of the holes 42 is formed with six ribs 48 since that number of ribs has been found to provide the support required to keep the fastener aligned with the center axis of the hole. Problems in maintaining the fasteners axially aligned with the holes 42 have been encountered where only three or four fastener-retaining ribs were provided at each hole. Providing more than six ribs increases the resistance to removal of the fasteners from the plastic strip in the course of driving the fasteners into a multi-component workpiece, e.g., a wood flooring panel and a metal substrate.

Figure 2:
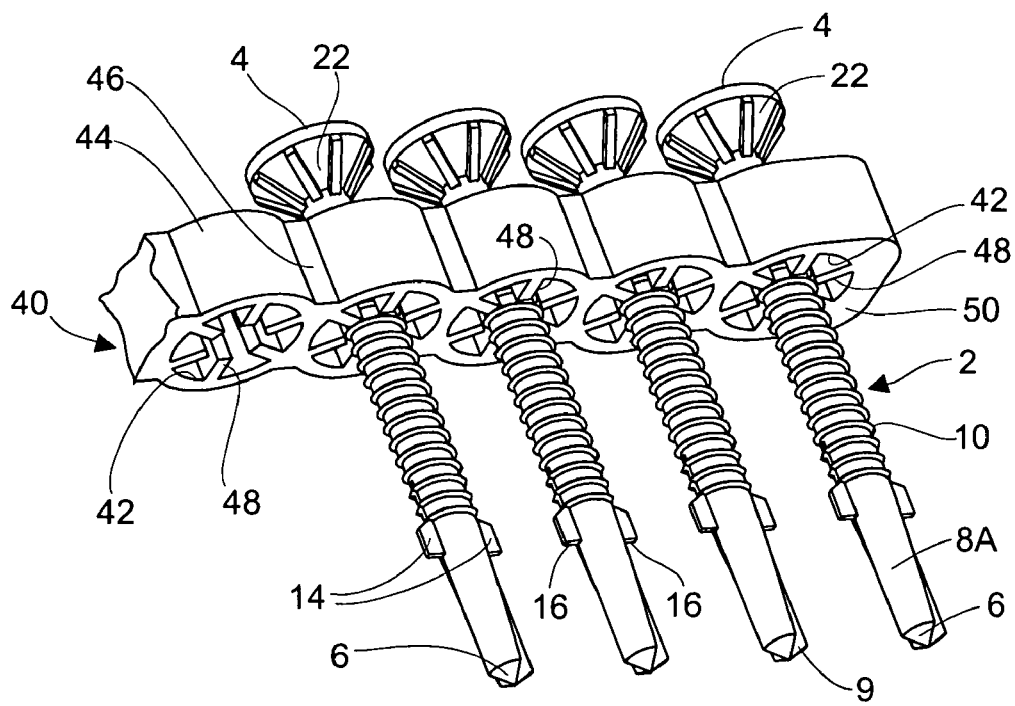
FIG. 2 is a perspective of the same clip from a different viewpoint.

The fasteners are mounted in holes 42 in plastic strip 40 so that their heads 4 are spaced from the upper end surface 60 of the strip, as shown in FIGS. 1-3. In this connection it is to be noted that the maximum outside diameter of each head 4 is less than the diameter of the hole 42 in which it is mounted, but larger than the diameter of the circle formed by ribs 48 and webs 56. Ribs 48 and webs 56 grip the threaded portion of the fasteners and hold them in the plastic strip. Webs 56 are provided to assure that the fasteners are held perpendicular in holes 42. It has been determined from the use of plastic strips wherein the holes 42 had ribs 48 but not the webs 56 that when the fasteners 2 are inserted by machine into holes 42, the wings 14 tend to cut away by abrasion a small portion of one or more ribs, thereby reducing the grip exerted by the ribs and resulting in the fasteners being somewhat loose rather than being held exactly perpendicular in the plastic strip. The existence of play between the fasteners and the strip may interfere with proper driving of the fasteners by the tool bit. The addition of webs 56 increases the total surface area gripping the fasteners and thereby reduces the amount of "play" between the fasteners and the strip that supports them, even though one or both of the webs may be torn by the wings 14 when the fasteners are inserted into the strip. The thickness of webs 56 is kept small to make it easier for the webs to yield rather than tear under the influence of wings 14 as the fasteners are inserted into the strip. Making webs 56 thin rather than thick also facilitates expelling of the fasteners from the plastic strip by operation of the driver tool disclosed in my copending HMH-90 CIP application. As noted previously, having the fastener-retaining ribs 48 and the webs 56 assures that the fasteners are axially aligned with holes 42 when they are advanced into driving position. Such alignment is important to facilitate rapid and reliable locking engagement of the driving tool bit with the recesses 24 or 26 in the heads of successive fasteners.

By way of example, but not limitation, strip 40 may have a maximum width (the width at the center of the curved segments 44) of about 0.650 inch, a width of about 0.510 inch at the reduced width portions 46, and a height of about 0.310 inch, holes 42 may have an i.d. of about 0.510 inch, ribs 48 may have a thickness of about 0.075 inch, webs 56 may have a thickness of about 0.010 inch, the circle formed by the inner edges of ribs 48 and webs 56 may have a radius of about 0.225 inch, and the two wings 14 of each fastener are tangent to an imaginary circle having a diameter of about 0.020 inch greater than the maximum o.d. of the self tapping threaded section 22. Plastic strips having the foregoing shape and dimensions may be used to support fasteners of various lengths having a threaded section with an o.d. of about 0.230 inch.

The cutting faces 9 of flutes 8A and 8B provide the fastener with a self-drilling capability, while the screw thread 10 that follows the cutting flutes provides the fastener with a self-tapping and screw fastening capability. The wings 14 provide the fasteners with a drilling capability with respect to a wooden flooring panel or board or member made of wood or other relatively low tensile strength material or material of like density, while being fragile enough to break off when subjected to a rotational engagement with a harder substrate such as one made of steel. With that combination capability in mind, the fastener clips provided by this invention may be used with the apparatus disclosed in the HMH-90 CIP application to reliably secure together two structural components without need for pre-drilling holes in either component.

Mounting the fasteners in the plastic strip 40 facilitates automatically feeding the fasteners for application by a torque driver device, with the automatic feeding being achieved by a magazine attached to the driver device that includes means for slidably holding a clip of fasteners, i.e., the strip 40 filled with fasteners 2, and pusher means for advancing the clip so that each successive fastener in turn is in position to be engaged by a tool bit attached to the torque driver device and driven by that tool bit out of strip 40 into structural components that are to be attached to one another. Such a magazine is described and illustrated in my copending HMH-90 CIP application.

More particularly, if the fastener is driven into a workpiece consisting of two or more components that are to be secured to one another, e.g., a hard wood floor board and a steel supporting substrate, by means of an axially-biased power-driven rotating tool bit, e.g., as described in my HMH-90 CIP application, the cutting flutes 6 will drill through the several components of the workpiece to form a starting hole, and when the forward portion of the screw thread 10 encounters the hole drilled by the cutting flutes, the leading turn of the screw thread will commence a tapping operation, whereby continued rotation of the fastener under the influence of an applied axial force in the direction of the workpiece will cause the screw thread 10 to form a mating screw thread in the surrounding surface of the hole formed by the cutting flutes.

Use of the fasteners is now described in relation to attaching a hard wood floor panel to a high tensile strength steel substrate using an impact torque driver apparatus as described in my HMH-90 CIP application. It is to be understood that the impact torque driver of that apparatus is designed to rotatively drive a tool bit until it encounters turning resistance, and then it shifts to a combination rotation and impact mode to overcome the resistance to rotation. When fastener is engaged by the downwardly biased rotating tool bit operating under the influence of the rotary impact driver, the fastener will be driven out through the bottom of the strip and as this occurs, the cutting flutes 8A and 8B and wings 14 will drill through the hard wood panel and then flutes 8A and 8B will drill a hole in the metal substrate. Wings 14 enlarge the hole cut by flutes 8A and 8B in the wood panel so that the threaded portion 10 of the fastener will pass through easily through the hard wood panel, thereby avoiding any lifting on the panel as tends to occur if the screw thread portion of the fastener engages and undergoes a screwing action with the panel. As the cutting flutes 8A and 8B penetrate the metal substrate, the relatively weak wings 14 will be sheared off as a result of the resistance to penetration offered by the hard substrate. When the forward portion of the screw thread 10 encounters the hole in the metal substrate formed by the cutting flutes, the leading turn of the screw thread 10 will commence a screw-tapping operation in the surrounding metal surface that defines the hole formed by cutting flutes 8A and 8B, and continued rotation of the fastener under the influence of the downward force exerted by the operator will cause the fastener to make a tight screw connection with the substrate, thereby anchoring the wood panel to the steel substrate.

As the fastener is driven down out of strip 40 into a workpiece the axial and rotational forces exerted on the fastener by the torque driver device tool bit will cause the cutting ribs 28A or 28B on the underside of its head 4 to rapidly chew away the plastic retainer ribs 48 and webs 56 that surround and grip that fastener. The removed pieces of ribs 48 and webs 56 will be forced out of the plastic strip by the head of the fastener as the fastener exits that strip and is driven into the multi-component workpiece. Having the fasteners positioned with their heads elevated above the upper side of the plastic strip is advantageous in that it allows the screws to achieve a relatively high rotational speed before the cutting ribs 28A or 28b engage the fastener retaining ribs 48 and webs 56, thereby facilitating rapid cutting away of ribs 48 and webs 56. Also as each fastener is driven through a hard wood flooring panel into an underlying metal substrate, the cutting ribs 40 act to cut away portions of the flooring panel and thereby form a countersink to accommodate the head of the driven fastener, thereby permitting the upper surface of the fastener head to be flush with the upper surface of the flooring panel. Preferably the fasteners are driven so that their heads are below the upper surface of the flooring, so that they cannot impede sliding movement of goods along the flooring unless and until the flooring becomes worn. Further, as described in my HMH-90 CIP application, having the fastener heads 4 spaced upwardly from the plastic strip allows the head of the leading fastener in the strip to be intercepted by a portion of the driver apparatus at a point where it is axially aligned with the tool bit, thereby assuring that the tool bit will properly engage the recess 28A or 28B of the fastener.

In addition to what is obvious from the foregoing specific description, a further advantage of the invention is that the fasteners provide exceptional holding strength when driven as herein described into attaching relation with wood/steel substrates, and can be removed by an unscrewing action. Another advantage is that the fasteners may be manufactured using a conventional screw machine. As a consequence, the cost of manufacturing the fasteners is modest, particularly in view of the economic benefits gained from using the fasteners in the manner described herein which eliminates the need to pre-drill one or more of the components that are to be secured to one another by the fasteners. A further advantage is that the screws may be made in different lengths and also different diameters. In the latter case certain dimension of the plastic supporting strip 40 may need to be changed. The plastic strips 40 also may be made in different lengths to accommodate a selected number of fasteners.

It is to be appreciated that certain changes may be made without departing from the essence of the invention. For one thing, the side surfaces of the strip may be flat rather than contoured as shown, or be flat but formed with narrow longitudinally extending, outwardly projecting ribs that can coact with supporting guide surfaces in the magazine to slidably support the strip and guide its movement as it advances each fastener in turn to driving position. The width of ribs 58 and the thickness of webs 56 also may be varied so long as they provide the desired alignment and gripping of the fasteners. Still other modifications of the shape of the plastic strip may be acceptable, keeping in mind that it is intended that when used the strip will remain intact except for the removal of ribs 48 and webs 56. It is contemplated also that the shape and number of cutting flutes 28A, 28b and wings 14 may be modified so long as they provide the desired cutting action. For example, the flat surfaces 9 of the cutting flutes could be formed so as to extend at an angle to the longitudinal axis of the fastener. Additionally the side surfaces 22 of the fastener heads may vary in height and their slope may be changed relative to the fastener shaft.

Of course clips of fasteners and plastic supporting strip in accordance with this invention are not limited in use to attaching wood flooring panels or boards to metal substrates. By way of example, the fasteners could be used to attach wood or composition wall panels to steel framing or to secure plastic or aluminum members to a steel substrate or to attach metal decking to a steel substrate. Still other applications, modifications and advantages of the invention will be obvious to persons skilled in the art from the foregoing description and the attached drawings.

What is claimed is:

1. A clip of fasteners for use in securing together two superimposed structural components, said clip comprising:
   a plastic strip having lengthwise extending top and bottom surfaces and two opposite side surfaces, a series of mutually aligned holes in the strip with each hole extending perpendicular to and between said top and bottom surfaces, each hole having a plurality of inwardly extending fastener-gripping ribs extending lengthwise between said top and bottom surfaces and webs connecting each rib with each adjacent rib, said webs being integral with said top surface and spaced from said bottom surface, said ribs and said webs of each hole having inner portions that are aligned to define a circular opening concentric with said each hole with said opening having a diameter smaller than the diameter of said each hole, and
   a fastener mounted in each of said circular openings, each fastener comprising a shaft having a tapered tip at one end and a head at its other end, said shaft also having (1) a drill portion that extends toward said head from said tapered point, (2) a screw portion comprising a helical thread that extends from said flutes to adjacent said head, and (3) cutting blade means projecting laterally from said drill portion adjacent said screw portion, said cutting blade means extending radially from the axis of said shaft a distance greater than said helical thread,
   each fastener having its said screw portion gripped by said ribs and webs of the said circular opening in which said each fastener is mounted,
   said head of each fastener extending outwardly beyond the periphery of said shaft and having a diameter larger than said circular opening defined by said ribs and webs but smaller than the diameter of said holes, said head also having a top surface and a tapered surface, said top surface having means adapted for engagement by a driving tool for rotating said fastener in a direction to cause said drill portion to drill a hole through two superimposed structural components and said threaded portion to screw into the lower of said structural components, and said tapered surface having a series of circumferentially spaced ribs adapted to function as cutting blades for cutting through said fastener-gripping ribs and said webs when simultaneously said fastener is driven down and rotated relative to said ribs and webs.

2. A clip of fasteners according to claim 1 wherein said cutting blade means comprises a pair of blades.

3. A clip of fasteners according to claim 2 wherein said ribs on the head of each fastener have a generally rectangular cross-sectional shape.

4. A clip of fasteners according to claim 1 wherein said ribs on the head of each fastener extend to and join the outer surface of the shaft of said each fastener.

5. A clip of fasteners according to claim 1 wherein each head of each fastener has a recess adapted to be operatively engaged by a tool bit for rotatively driving said each fastener.

6. A clip of fasteners according to claim 1 wherein said strip is formed of a moderate density thermoplastic material.

7. A clip of fasteners according to claim 6 wherein said plastic strip comprises a polymer selected from the group consisting of polyethylene, polypropylene, and nylon.

8. A fastener clip for use in supplying fasteners to a driver tool, said clip comprising:
a plastic strip comprising top and bottom surfaces and a plurality of holes extending between said top and bottom surfaces, each hole having a plurality of circumferentially spaced fastener-gripping ribs extending lengthwise between said top and bottom surfaces and webs formed between successive ribs at said top surface of said strip, said ribs only and said webs extending inwardly of said hole the same distance and together defining a circular opening smaller than said each hole; and
a series of fasteners each mounted in one of said holes, each of said fasteners comprising a shaft having a tapered tip at one end thereof and a head at a second opposite end thereof, said shaft also having a drill section that extends from said tapered tip toward said head, a screw section comprising a helical screw thread extending between said drill section and said head, and cutting blade means formed integral with and projecting radially of said drill section proximate to said screw section, said screw section being surrounded and gripped by said fastener-gripping ribs, said head extending outwardly beyond the periphery of said shank and having a top surface and a tapered bottom surface, said top surface of said head having means adapted for engagement by a driving tool for rotatively driving said fastener, and said tapered bottom surface of said head having a series of circumferentially spaced ribs adapted to function as cutting blades for cutting through said ribs and said webs when rotated under a downward axial force relative to said strip.

9. A clip according to claim 8 wherein said drill section has two cutting flutes.

10. A clip according to claim 8 wherein said fasteners are disposed so that said heads have a maximum diameter less than the diameter of said holes and greater than the diameter of said openings.

11. A clip according to claim 8 wherein said fasteners are disposed so that said heads are elevated above said top surface of said strip.

12. A clip according to claim 8 wherein the maximum diameter of said helical threaded section is greater than the maximum diameter of the portion of said drill section but less than the diameter of the circle of rotation of the periphery of said cutting blade means.

13. A clip according to claim 8 wherein said strip is characterized by having six mutually spaced fastener-gripping ribs extending inwardly of each of said openings.

14. A clip according to claim 8 wherein said webs have a thickness that is a fraction of the spacing between said top and bottom surfaces of said strip.

15. A fastener clip for use in supplying fasteners to a driver tool, said clip comprising:
a plurality of fasteners each comprising a shaft having (a) a tapered tip at one end thereof, (b) a head at a second opposite end thereof, (c) cutting flutes that extend from said tapered tip toward said head, (d) a screw section comprising a helical screw thread extending from said flutes to adjacent said head, and (e) a pair of relative thin cutting wings projecting from the cutting flutes adjacent to said screw section, said head having a diameter greater than said screw section, a top surface and a tapered surface extending away from said top surface toward said shaft, said top surface having means adapted for engagement by a driving tool for rotating said fastener in a direction to cause said thread to screw into a substrate, and said tapered surface having a series of circumferentially spaced ribs adapted to function as cutting blades when the fastener is rotated on its own longitudinal axis; and
a plastic strip comprising top and bottom sides characterized by top and bottom surfaces respectively and a plurality of holes extending upwardly from said bottom surface toward said top surface, each hole extending perpendicularly to said top and bottom surfaces and being characterized by a plurality of circumferentially spaced fastener-gripping ribs extending lengthwise between said top and bottom surfaces and webs connecting each rib with each adjacent rib only at said top surface of said strip, said ribs and said webs extending inwardly of said each hole the same distance and together defining a circular opening smaller than said each hole;
said fasteners being mounted in said strip, one at each hole, with said screw sections of said fasteners being gripped by the said ribs and webs associated with each hole, said heads projecting above said top surface of said strip, and said screw thread, said cutting wings and said cutting flutes projecting below said bottom surface of said strip,
whereby when said head of one of said fasteners is engaged by a downwardly biased rotating tool bit of a rotary impact driver and rotatively driven in a direction to (a) cause said drill portion to drill a hole through two superimposed structural components and said threaded portion to screw into the lower of said structural components and (b) drive said one fastener down and out of said strip, said circumferentially spaced ribs said head of said one fastener will cut through said fastener-gripping ribs and said webs as said one fastener is rotated and driven down and out of said strip.

16. A clip according to claim 15 wherein said ribs extend from said top surface to said bottom surface and said webs are relatively thin and form an end wall closing off the spaces between said fastener-gripping ribs at said top side of said strip.

17. A clip according to claim 15 wherein said ribs on said head have a rectangular cross-sectional shape.

18. A clip according to claim 15 wherein said ribs on said head have a triangular cross-sectional shape.

19. A clip according to claim 15 wherein the spacing between said top and bottom surfaces is about 0.310 inch and said webs have a thickness of about 0.010 inch.

* * * * *

UNITED STATES PATENT AND TRADEMARK OFFICE
CERTIFICATE OF CORRECTION

| | |
|---|---|
| PATENT NO. | : 7,025,551 B2 |
| APPLICATION NO. | : 10/618327 |
| DATED | : April 11, 2006 |
| INVENTOR(S) | : Harry M. Haytayan |

It is certified that error appears in the above-identified patent and that said Letters Patent is hereby corrected as shown below:

Column 9, claim 8, line 31, insert "only" after -- ribs --; and

Column 10, claim 15, line 51, insert "of" after -- ribs --.

Signed and Sealed this

Eighth Day of August, 2006

JON W. DUDAS
*Director of the United States Patent and Trademark Office*